United States Patent [19]

Flytzani-Stephanopoulos et al.

[11] Patent Number: 5,384,301
[45] Date of Patent: Jan. 24, 1995

[54] CATALYST FOR ELEMENTAL SULFUR RECOVERY PROCESS

[75] Inventors: Maria Flytzani-Stephanopoulos, Winchester; Wei Liu, Cambridge, both of Mass.

[73] Assignee: Massachusetts Institute of Technology, Cambridge, Mass.

[21] Appl. No.: 97,367

[22] Filed: Jul. 23, 1993

Related U.S. Application Data

[63] Continuation-in-part of Ser. No. 791,491, Nov. 12, 1991, Pat. No. 5,242,673.

[51] Int. Cl.$^6$ ............................................. B01J 23/10
[52] U.S. Cl. ................................. 502/304; 502/302; 502/306; 502/313; 502/321; 502/326; 502/328; 502/339; 502/340; 502/347; 502/349; 502/353; 423/244.06; 423/244.07; 423/593
[58] Field of Search ............... 502/303, 304, 340, 345, 502/302, 306, 313, 321, 326, 328, 339, 347, 349, 353; 423/244.06, 244.07, 593

[56] References Cited

U.S. PATENT DOCUMENTS

| | | | |
|---|---|---|---|
| 3,652,833 | 4/1972 | Watson et al. | 23/226 |
| 3,755,551 | 8/1973 | Bridwell et al. | 423/570 |
| 3,819,535 | 6/1974 | Huba et al. | 582/304 |
| 3,864,459 | 2/1975 | Stiles | 423/570 |
| 3,978,200 | 8/1976 | Bajars | 423/570 |
| 4,001,375 | 1/1977 | Longo | 423/563 |
| 4,081,519 | 3/1978 | Whelan | 423/437 |
| 4,251,496 | 2/1981 | Longo et al. | 423/239 |
| 4,346,063 | 8/1982 | Cahn et al. | 423/230 |
| 4,826,664 | 5/1989 | Kay et al. | 423/573 |
| 4,857,296 | 8/1989 | Brunelle et al. | 423/576 |
| 5,063,193 | 11/1991 | Bedford et al. | 502/304 |
| 5,242,673 | 9/1993 | Flytanzi-Stephanopoulos | 423/570 |

OTHER PUBLICATIONS

J. B. Rinckhoff, J. B. Pfeiffer, (ed.), "Sulfur Removal and Recovery from Industrial Processes," Advances in Chemistry Series, No. 139, p. 48, American Chemical Society, 1975.
K. V. Kwong et al., "The Parsons FGC Process Simultaneous Removal of SOx and NOx," presented at the Annual Meeting of AICHE, Chicago, Ill., Nov. 11–16, 1990.
Hunter, Jr. et al., "The Allied Sulfur Dioxide Reduction Process for Metallurgical Emissions," Advances in Chemistry Series, No. 139, p. 48, American Chemistry Society, 1975.
Querido and Short, "Removal of Sulfur Dioxide from Stack Gases by Catalytic Reduction to Elemental Sulfur with Carbon Monoxide" Ind. Eng. Chem. Process Des. Develop., vol. 12, No. 1, p. 10, 1973.
Khalafalla et al., "Catalytic Reduction of Sulfur Dioxide on Iron–Alumina Bifunctional Catalysts," Ind. Eng. Chem. Prod. Res. Develop., vol. 10, No. 2, p. 133, 1971.
Bazes et al., "Catalytic Reduction of Sulfur Dioxide with Carbon Monoxide on Cobalt Oxides," Ind. Eng. Chem., Prod. Res. Develop. vol. 14, No. 4 p. 264, 1975.
Hibbert and Campbell, "Flue Gas Desulfurization: Catalytic Removal of Sulfur Dioxide by Carbon Monoxide on Sulfided La1–xSrx C603", Applied Catalysis, vol. 41, p. 289, 1988.
Hass et al., "Packaged Selector Units —A New Approach to Sulfur Recovery," presented at the 60th Annual GPA Convention, Mar. 23–25, 1991 San Antonio, Tex.
Powell et al., "Preparation of Cerium Dioxide Powders for Catalyst Supports," J. Am. Ceram. Soc., vol. 71, C–104–C–106, 1988.
Courty et al., "The Preparation of Highly Dispersed Mixed Oxides and Oxide Solid Solutions by the Pyrolysis of Amorphous Precursors," (in french), Powder Technol., vol. 7, p. 21, 1973.
Dorchak and Gangwal, "Direct Sulfur Recovery Process for Elemental Sulfur Recovery from Gas," ACS Div. Fuel Chemistry, vol. 35, No. 1, p. 207, 1990.
United States Department of Energy, Morgantown Energy Research Center, "Chemistry of Hot Gas Cleanup in Coal Gasification and Combustion," Feb., 1978.
Gilbert, "The NOXSO POC Pilot Plant Advanced Flue Gas Clean–Up Technology," 6th Annual Coal Prep'n., and Environ. Control Contractor Conference Proceedings, Aug. 1990, Pittsburgh.

*Primary Examiner*—Anthony McFarlane
*Attorney, Agent, or Firm*—Wolf, Greenfield & Sacks

[57] ABSTRACT

A catalytic reduction process for the direct recovery of elemental sulfur from various $SO_2$-containing industrial gas streams. The catalytic process provides high activity and selectivity, as well as stability in the reaction atmosphere, for the reduction of $SO_2$ to elemental sulfur product with carbon monoxide or other reducing gases. The reaction of sulfur dioxide and reducing gas takes place over a metal oxide composite catalyst having one of the following empirical formulas:

$$[(OF_2)_{1-n}(RO_1)_n]_{1-k}M_k,$$

$$[(FO_2)_{1-n}(RO_{1.5})_n]_{1-k}M_k, \text{ or}$$

$$[Ln_xZr_{1-x}O_{2-0.5x}]_{1-k}M_k$$

wherein $FO_2$ is a fluorite-type oxide; RO represents an alkaline earth oxide; $RO_{1.5}$ is a Group IIIB or rare earth oxide; Ln is a rare earth element having an atomic number from 57 to 65 or mixtures thereof; M is a transition metal or a mixture of transition metals; n is a number having a value from 0.0 to 0.35; k is a number having a value from 0.0 to about 0.5; and x is a number having a value from about 0.45 to about 0.55.

10 Claims, No Drawings

CATALYST FOR ELEMENTAL SULFUR RECOVERY PROCESS

This invention was made with government support under Grant No, DE-FG-92PC92534 awarded by the Department of Energy. The government has certain rights in the invention.

This application is a continuation-in-part of U.S. application Ser. No. 07/791,491, filed Nov. 12, 1991 now U.S. Pat. No. 5,242,673.

BACKGROUND OF THE INVENTION

1. Field of the Invention

The present invention relates to recovery of elemental sulfur from gas streams containing sulfur dioxide.

2. Description of the Prior Art

Flue gases emitted from burning sulfur-containing fossil fuels are the most common dilute sulfur dioxide ($SO_2$) containing industrial gases. The majority of commercial scale flue gas desulfurization (FGD) plants in use today for combustion gas purification are based on wet scrubbing processes. Many of them are of the "throwaway" type, fixing the sulfur in a solid waste product, which requires disposal. These FGD systems do not recover elemental sulfur. However, several other wet and dry FGD processes are of the regenerative type combining sulfur dioxide removal with active medium regeneration and concomitant sulfur recovery.

Many sulfur recovery methods have been proposed. Often the type and location of the primary operation (sulfur source) dictate the choice of the sulfur recovery method. For example, sulfur recovery from metallurgical operations (smelters, sulfide ore roasters) is typically in the form of sulfuric acid. On the other hand, petroleum refineries emit $H_2S$-rich gas streams which are processed in multi-stage Claus plants to recover elemental sulfur.

Recovery of sulfur values in elemental sulfur form is more desirable than sulfuric acid or liquid $SO_2$ as local market conditions are typically more restrictive for the latter. (See, for example, J. B. Rinckhoff, J. B. Pfeiffer, (ed.), "Sulfur Removal and Recovery from Industrial Processes," *Advances in Chemistry Series*, No. 139, p. 48, American Chemical Society, 1975). For $SO_2$-containing industrial gases, this means reducing the $SO_2$ with a gaseous reducing agent, such as carbon monoxide, hydrogen, synthesis gas ($H_2+CO$), or natural gas, or with a carbonaceous solid (such as activated charcoal, coke, anthracite coal). The Allied Chemical sulfur dioxide reduction technology employs a catalyst over which $SO_2$ reduction by natural gas ($CH_4$) takes place, producing a mixture of $H_2S$, elemental sulfur and (unconverted) $SO_2$. After condensation of sulfur, further sulfur recovery is accomplished in two-stage Claus plants. This process requires relatively concentrated $SO_2$ (>4.0%) gases and downstream Claus plants to complete sulfur recovery. (See, for example, W. D. Hunter, Jr., "Reducing $SO_2$ in Stack Gas to Elemental Sulfur," *Power* 117 (9), 63, 1973; Watson et al., U.S. Pat. No. 3,653,833; and Bridwell et al., U.S. Pat. No. 3,755,551.)

The RESOX process, developed by the Foster Wheeler Energy Corporation, and described in "The FW-BF $SO_2$ Removal System," *Sulfur*, No. 119, 24–26 and 45, July–August 1975, partially reduces the $SO_2$-rich streams (>10.0% $SO_2$) to elemental sulfur and organosulfur compounds by reaction with coke at 850°–900° C. (See also, R. E. Rush, and R. A. Edwards, "Operating Experience with Three 20 MW Prototype Flue Gas Desulfurization Processes at Gulf Power Company's Scholtz Electric Generating Station," presented at EPA Flue Gas Desulfurization Symposium, Hollywood, Fla., November 8–11, 1977).

Direct flue gas reduction by synthesis gas over an undisclosed catalyst is proposed by K. V. Kwong et al. in "The Parsons FGC Process Simultaneous Removal of $SO_x$ and $NO_x$," presented at the 1990 Annual Meeting of AIChE, Chicago, Ill., Nov. 11–16, 1990, to simultaneously reduce the oxygen, $SO_x$ and $NO_x$ in the flue gas. The $H_2S$ produced is selectively recovered by solvents, concentrated and taken to multi-stage Claus plants for elemental sulfur recovery. This process does not achieve a single-step $SO_2$ reduction to sulfur. Similarly, earlier proposed schemes of flue gas reduction could not achieve both high $SO_2$ conversion as well as high selectivity to elemental sulfur in a single-stage catalytic reactor.

In addition to power plant $SO_2$ emissions, dilute sulfur dioxide-containing gas streams are produced in waste incinerators, industrial furnaces, process equipment used in petroleum refineries and sulfuric acid plants, and spent sorbent or catalyst regenerator equipment. Sulfur recovery involves several steps, such as partial reduction of $SO_2$ to $H_2S$, followed by Claus processing. No single-stage process presently exists to directly reduce the varying $SO_2$-effluent gases to elemental sulfur over a catalyst which displays both high activity and high selectivity.

The catalytic removal of sulfur dioxide by carbon monoxide involves a main reaction producing elemental sulfur:

$$SO_2 + 2CO = \frac{1}{x} S_x + 2CO_2 \qquad (1)$$

where x varies between 2 and 8, as well as a competing side reaction producing carbonyl sulfide:

$$CO + S = COS \qquad (2)$$

At about the stoichiometric ratio of $CO/SO_2$ reaction (1) is favored, while excess CO increases production of COS.

P. R. Ryason et al. in U.S. Pat. No. 3,454,355 (and Air Pollut. Contr. Ass. 17, 796, 1967), reported on the use of single-bed catalysts (Cu, Pd, Ag, Co or Ni supported on alumina) to produce sulfur from dry sulfur dioxide gases. L. A. Haas et al., in U.S. Pat. No. 3,888,970, employed a double layer catalyst bed for the reduction of $SO_2$ by CO to elemental sulfur with alumina-supported Fe, Cr, Ni, Mn, or Co as first layer and alumina as second layer. A. B. Stiles, in U.S. Pat. No. 3,856,459, proposed the reduction of $SO_2$ by a refractory reducing gas over a supported catalyst containing thorium oxide in combination with one or more oxides of Cr, Mn, Ba, Sr, Ca, Ta or mixed rare earth chromites. This process produced a gas mixture of elemental sulfur, hydrogen sulfide and other sulfur containing compounds. For the selective catalytic reduction of $SO_2$ by CO to elemental sulfur under dry conditions, L. Bajars proposed mixed oxides of elements from the lanthanide group and the groups IVB and VB of the Periodic Table in U.S. Pat. No. 3,978,200. This type of catalyst typically needs to be activated by reducing gases at high temperature. J. M. Whelan, in U.S. Pat. No. 4,081,519, disclosed a ceramic catalyst of the following composition for the oxidation of CO by $SO_2$: $W_kX_nJ_{(1-k-n)}ZO_{(3\pm m)}$, wherein W is Zr, Sn, Th or mixture thereof, X is an alkaline earth metal or mixture thereof, J is Sc, Y, a rare-earth element or mixture thereof, and Z is a metal of the first transition series or a mixture thereof.

Perovskite-type mixed oxides ($ABO_3$) containing transition metals have long attracted attention as catalysts for heterogeneous reduction/oxidation reactions. (See, for example, D. B. Meadowcroft, *Nature*, 226, 847, 1970; and R. J. H. Voorhoeve, et al., *Science*, 177, 353, 1972). Generally, these type of oxides possess high electronic and oxygen ionic mobility, and a variety of surface sites for the adsorption/description of reacting species. These are essential properties required for a reduction/oxidation reaction. Therefore, perovskite oxides have been widely investigated for the reactions of carbon monoxide, nitric oxide and hydrocarbons in the field of environmental pollution control. However, most of these reactions are poisoned by sulfur dioxide. Recently, the strontium substituted lanthanum cobalt perovskite oxide ($La_{1-x}Sr_xCoO_3$), a well known perovskite catalyst, has been extensively studied as a catalyst for the reduction of $SO_2$ by CO by D. B. Hibbert and R. H. Campbell in Applied Catalysis 41, 173 and 289, 1988. Nearly all $SO_2$ was converted to elemental sulfur with a dry feed gas of stoichiometric $SO_2$ and CO composition over the catalyst, when x=0.3. However, this catalyst lost the perovskite structure and became a mixture of sulfides and oxysulfides of the metals after a short induction period under reaction conditions.

The prior art, therefore, does not teach or suggest the formulation of an active and stable catalyst for direct elemental sulfur recovery from $SO_2$-containing industrial gas streams by reacting these gas streams with a reducing gas, particularly, in the presence of water vapor.

SUMMARY OF THE INVENTION

Accordingly, the present invention provides a process for reducing $SO_2$, with carbon monoxide or other reducing gas, over a catalyst which displays high activity and selectivity for $SO_2$ reduction to elemental sulfur product, while remaining stable in both reducing and oxidizing atmospheres and active in the presence of water vapor.

The catalytic sulfur recovery process of the present invention occurs in a single stage involving direct reduction of the $SO_2$ in an off-gas stream to elemental sulfur. The process involves feeding a gas stream containing $SO_2$ into a catalytic reactor, introducing a reducing gas stream into the reactor, and reacting the $SO_2$ and reducing gas in the presence of a metal oxide composite catalyst to produce elemental sulfur.

In one embodiment, the metal oxide composite catalyst formulation has the following empirical formula:

$$[(FO_2)_{1-n}(RO)_n]_{1-k}M_k;$$

in another embodiment of the present invention, the catalyst has the following empirical formula:

$$[(FO_2)_{1-n}(RO_{1.5})_n]_{1-k}M_k.$$

In one specific embodiment of the present invention, the catalyst has the following empirical formula:

$$[Ln_xZr_{1-x}O_{2-0.5x}]_{1-k}M_k,$$

wherein $FO_2$ is a fluorite-type oxide; RO represents an alkaline earth oxide; $RO_{1.5}$ is a Group IIIB or rare earth oxide; Ln is a rare earth element having an atomic number from 57 to 65 or a mixture thereof; M is a transition metal or a mixture of transition metals; n is a number having a value from 0.0 to 0.35; k is a number having a value from 0.0 to about 0.5; and x is a number having a value from about 0.45 to about 0.55.

Other objects and features of the present invention will become apparent from the following detailed description.

DETAILED DESCRIPTION OF THE INVENTION

The present invention involves the removal of $SO_2$ from industrial gas streams by catalytic reduction of the $SO_2$ to elemental sulfur.

The process of the present invention includes feeding a gas stream containing sulfur dioxide into a catalytic reactor, introducing a reducing gas stream into the reactor, and reacting the sulfur dioxide of the gas stream with the reducing gas in the presence of a catalyst to produce elemental sulfur. Depending on the composition of feed gases and reaction conditions used, other reduced sulfur compounds may be also produced by the process of the present invention, and generally include carbonyl sulfide, hydrogen sulfide, carbon disulfide, and mixtures thereof. The elemental sulfur contained in the product gas stream is removed by employing well-known techniques such as condensation. Recovered sulfur is then stored for further processing or sale, while the tail gas, free of elemental sulfur, can be treated in several ways depending on its composition. The tail gas is directly released into the atmosphere if it chiefly consists of inert gases. Alternatively, the tail gas stream can be recycled into a boiler if a significant amount of reducing gases exists in the tail gas. Lastly, the tail gas can be further treated, for example, by a Claus reactor if the existing reduced and oxidized sulfur compounds in the gas are nearly in stoichiometric amounts.

The feed gas stream containing sulfur dioxide preferably includes a combustion off-gas, regeneration effluent gas, or industrial process gas. Any stream containing sulfur dioxide can be treated by the catalytic reduction process of the present invention. Typically, the amount of sulfur dioxide present in the feed gas stream will range in concentration between 0.1% to about 10.0% by volume. Other components of the feed gas stream include, for example, nitrogen, carbon dioxide, oxygen, and water vapor (steam).

The reducing gas stream, introduced into the reactor, can be any reducing gas such as carbon monoxide, synthesis gas, natural gas, and mixtures thereof. Preferably, a carbon monoxide reductant is used, reducing sulfur dioxide according to reaction (1) above. The amount of the reducing gas stream introduced into the reactor preferably is such that at least 70% conversion of the sulfur dioxide is achieved. When using a carbon monoxide reductant, the ratio of reducing gas to sulfur dioxide is preferably about 2.0, because at such ratios, selectivity toward elemental sulfur of at least 95% will be achieved on a dry gas basis, and the product gas will be of stoichiometric composition suitable for further treatment in the presence of water vapor. As the ratio of reducing gas is increased, however, the selectivity of the conversion increases toward reduced sulfur compounds such as carbonyl sulfide at the expense of elemental sulfur production. As a result, the amount of the reducing gas used should be suitably controlled to obtain high elemental sulfur yield. A greater amount of reducing gas will be needed when other oxidizing components, such as oxygen, and/or nitrogen oxides, exits. Typically, the feed gas and reducing gas stream pass through the reactor at a space velocity (v/v/h) between about 500 and about 100,000 h$^{-1}$.

The catalyst is a metal oxide composite having the following empirical formula:

$$[(FO_2)_{1-n}(RO)_n]_{1-k}M_k \qquad (I)$$

wherein $FO_2$ is a fluorite-type oxide; RO represents an alkaline earth oxide; M is a transition metal or a mixture of transition metals; n is a number having a value from 0.0 to 0.35; and k is a number having a value from 0.0 to about 0.5.

In another embodiment, the catalyst is a metal oxide composite having the following empirical formula:

$$[(FO_2)_{1-n}(RO_{1.5})_n]_{1-k}M_k \qquad (II)$$

wherein $FO_2$ is a fluorite-type oxide; $RO_{1.5}$ is a Group IIIB or rare earth oxide; M is a transition metal or a mixture of transition metals; n is a number having a value from 0.0 to about 0.35; and k is a number having a value from 0.0 to about 0.5.

In an alternative embodiment, the catalyst has the following empirical formula:

$$[Ln_xZr_{1-x}O_{2-0.5x}]_{1-k}M_k \qquad (III)$$

wherein Ln is a rare earth element having an atomic number from 57 to 65 or a mixture thereof; M is a transition metal or a mixture of transition metals; k is a number having a value from about 0.0 to about 0.5; and x is a number having a value from about 0.45 to about 0.55.

A fluorite is a common ionic structure known to those of skill in the art, and is common when eight-coordination of the cation is favored. Typically, the stochiometry of a fluorite structure is 1:2, and oxides of larger quadrivalent (4+) cations frequently belong to the fluorite-type structure. In the above-noted empirical formulas (I) and (II), the fluorite-type oxide is selected from the group consisting of cerium oxide, thorium oxide, hafnium oxide, tantalum oxide, and zirconium oxide.

These oxides are well known for high oxygen vacancy concentrations and high ionic conductivity properties. (See, for example, H. L. Tuller and P. K. Moon, Materials Science and Engineering, B1, 171-191, 1988). These oxides, except for tantalum oxide, belong to the extrinsic oxygen ion conductor type, in that their oxygen vacancy and conductivity properties are usually enhanced by doping other impurity ions into their crystal lattices. As noted above, in empirical formulas (I) and (II), the selected fluorite-type oxides may be doped with either a divalent metal oxide (RO) or a trivalent metal oxide ($RO_{1.5}$). The divalent oxide is selected from Group IIA of the alkaline earth elements, such as magnesium, calcium, strontium, etc., while the trivalent oxide is selected from a Group IIIB element, a rare earth element or a mixture thereof. Typically, the Group IIIB oxide, rare earth oxide or mixture thereof is an oxide selected from the group consisting of scandium, yttrium, lanthanum, praseodymium, neodymium, samarium, europium, gadolinium, terbium, dysprosium, holmium, erbium, thulium, ytterbium, and lutetium. To keep the fluorite-type crystal structure, the dopants content used should not be greater than 35 atomic percent.

The materials inside the bracket in the empirical catalyst formula (III), $Ln_{1-x}Zr_xO_{2-0.5x}$, are rare earth zirconates. Zirconates of the rare earth elements having atomic numbers from 57 to 65 (from lanthanum to terbium) form a solid solution of pyrochlore structure when x is about 0.5. The pyrochlore structure can be considered as an ordered defect fluorite structure. Pyrochlores, such as $Gd_2Zr_2O_7$, different from fluorite-type oxides, are intrinsic anion conductors with substantial ionic conductivities as pure materials where there is no possibility of dopant-vacancy association. (See, for example, M. P. van Dijk, K. J. de Vries, and A. J. Burggraaf, Solid State Ionics, 9&10, 913-920, 1983). Fluorites, on the other hand, are extrinsic conductors as mentioned above and there will always be a possibility of dopant-vacancy association leading to degraded electrical properties and thermodynamically metastable state.

The oxygen ion conducting materials serve as an oxygen exchange medium in the above composite catalyst formulations, (I), (II), and (III), during a Redox reaction. Because these oxides are ceramic materials, chemically resistant to acid and basic gases, they are stable in the acrid reacting atmosphere of the process of the present invention. However, these materials usually have low electronic conductivity and weak active surface sites for the chemisorption of reacting species. Therefore, transition metals are added into the catalyst to improve the electronic transfer properties and provide active surface sites for chemisorption. Typically, the transition metals used in the present catalyst formulations are selected from the group consisting of chromium, manganese, iron, cobalt, nickel, copper, zinc, molybdenum, rhodium, palladium, silver, platinum, and gold. Different from other catalysts, the transition metals are used here as additives in atomic contents not exceeding 50%.

It is believed that oxygen atom and electron transfer processes are involved in the oxidation/reduction cycle during catalytic reduction of $SO_2$. The catalysts of present invention combine ionic, electronic, and surface adsorption properties together to provide a stable and active catalyst for $SO_2$ reduction. The transition metals have to be finely dispersed to display the concerted effect during the reaction. This kind of catalyst formulation is new in the material science field.

The above metal oxide composite catalysts can be prepared by conventional catalyst preparation methods. For example, the bulk catalyst can be prepared by either coprecipitating the solution mixtures of the involved elements, or by impregnating the transition metals on a porous ion conducting material. The supported catalyst can be prepared by coating both the ion conducting materials and the transition metals on an inert catalyst support such as alumina. The transition metals in the final product are finely dispersed so that the concerted effect of electronic and ionic transfer is displayed during the catalytic reaction by the intimate contact of metal/semiconductor.

The bulk catalyst typically has a surface area of 1.0 m$^2$/g to about 100 m$^2$/g. If supported, the catalyst preferably is in the range of 0.5 to 50% by weight, and has a surface area in the range of 20 m$^2$/g to about 500 m$^2$/g. Physical forms of the composite catalysts of the present invention may include granules, tablets, extrusions or pellets. Various other active phase-on-support configurations such as honeycomb monoliths may also be used as would be apparent to those of skill in the art.

The process of the present invention is typically carried out at temperatures of between about 300° C. to about 800° C. Preferably, the reaction of the present invention occurs at temperatures of between about 350° C. to about 650° C. The most preferable reaction temperature is between about 400° C. to about 550° C. The preferred reaction pressure is atmospheric, although other pressures may be used.

The present invention will be further illustrated by the following examples which are intended to be illustrative in nature and are not to be construed as limiting the scope of the invention.

EXAMPLE I

The activity and selectivity of the reduction of sulfur dioxide by carbon monoxide in the presence of a metal oxide composite catalyst formulation, having the empirical formula: $[(FO_2)_{1-n}(RO_{1.5})_n]_{1-k}M_k$ was examined. The catalyst, bulk cerium oxide doped with 2 atomic percent lanthanum, $CeO_2(La)$, was prepared, as described below.

A cerium nitrate solution was prepared by dissolving 0.05 moles of $Ce(NO_3)_3.6H_2O$ (99% purity), Aldrich Chemical Company (Milwaukee, Wis.), contaminated by 2 atomic percent lanthanum, in 100 ml of distilled water. To this solution, an aqueous solution of 0.05 moles of citric acid monohydrate, Aldrich (reagent grade), was added. The solutions were mixed slowly over one hour, adding the cerium nitrate solution into the citric acid solution. The mixed solution was dried in a rotary evaporator at 70° C. for one hour, to a viscous fluid end point, then dried in a vacuum oven at 70° C. overnight. A solid foam was formed, and was calcined for three hours in flowing air at 600° C. The resulting solid was crushed and sieved, to particles between 20 and 35 mesh, having 34 m$^2$/g surface area and 0.06 g/cc packing density.

Activity of the catalyst was evaluated in a packed bed reactor consisting of a 1.0 cm I.D. quartz tube, with a quartz frit mounted in the middle of the tube for supporting the catalyst. Approximately 120 mg of the above catalyst was loaded into the reactor and pretreated for one hour in 10% CO/He at 600° C. A gas stream, having a flowrate of 200 STP cc/min, containing 1% $SO_2$, 2% CO by volume and the balance He, was then introduced into the reactor. Over a temperature range of 500° C. to 700° C., 95% of inlet $SO_2$ was converted into elemental sulfur; COS and unreacted $SO_2$ comprised the balance of inlet $SO_2$ conversion products. Sulfur was knocked out of the product gas stream by condensation in an ice trap. Inlet and exit gases were analyzed by gas chromatography.

As indicated by the above experimental results, use of a composite catalyst of the present invention without the addition of transition metals yields better than 95% sulfur dioxide conversion, highly selective toward elemental sulfur. However, the catalyst needs to be activated, by using reducing gas or by initiating at a high reaction temperature.

EXAMPLE II

The preparation of a metal oxide composite catalyst of the present invention, having the formula: $[(FO_2)_{1-n}(RO_{1.5})_n]_{1-k}M_k$ by impregnating a porous oxygen ion conductor material with transition metals was examined.

A $CeO_2$ support, having particle sizes between 35 and 100 mesh was prepared by the decomposition of $(CH_3CO_2)_3Ce.xH_2O$ (99.9% purity), Aldrich, at 750° C. for 3 hours. The resulting $CeO_2$ had a specific surface area of 22 m$^2$/g and a packing density of 0.8 g/cc.

The $CeO_2$ support was then impregnated by using the incipient wetness method with 0.5 M copper, nickel and cobalt nitrate solutions, respectively. The wetted samples were dried at 60° C. for 12 hours and then calcined at 600° C. for 3 hours. The resulting impregnated catalysts, $Cu/CeO_2$, $Co/CeO_2$, $Ni/CeO_2$, each contained 8.5 atomic percent transition metal.

As indicated by the resulting impregnated catalysts, it is clear that the composite catalyst formulations of the present invention can be prepared by impregnating support materials with solutions of transition metal ions.

EXAMPLE III

The activity and selectivity of the reduction of sulfur dioxide by carbon monoxide in the presence of the catalysts prepared in EXAMPLE II was examined.

Activity of the catalysts was tested in a quartz tube reactor having a 0.6 cm I.D. Approximately 150 mg of each catalyst was independently tested as described in EXAMPLE I. A gas stream, having a flowrate of 100 STP cc/min, containing 1% $SO_2$, 2% CO by volume and the balance He, was introduced into the reactor. Over a temperature range of 470° C. to 600° C. for all three catalysts, 95% of inlet $SO_2$ was converted to elemental sulfur; COS and unreacted $SO_2$ comprised the balance of inlet $SO_2$ conversion products.

When the same gas stream also contained 2% $H_2O$ by volume, 72% of inlet $SO_2$ was converted to elemental sulfur; while $H_2S$ and unreacted $SO_2$, as well as trace amounts of COS, comprised the balance of conversion products. This evaluation was performed over a temperature range of 500° C. to 600° C. for all three catalysts.

X-ray powder diffraction results indicated the existence of only fluorite-type crystal phase in all three spent catalysts.

This example illustrates that the metal oxide composite catalysts of the present invention, prepared by impregnating support materials, are active and stable catalysts, as better than 95% sulfur dioxide conversion highly selective toward elemental sulfur was realized in a dry process and no pre-activation was required. Furthermore, while the addition of water vapor promoted the production of $H_2S$, the catalyst was still active as a significant sulfur yield (72% conversion of inlet $SO_2$) was realized.

EXAMPLE IV

The activity and selectivity of the reduction of sulfur dioxide by carbon monoxide with presence of a metal oxide composite catalyst having the formula: $[(FO_2)_{1-n}(RO_{1.5})_n]_{1-k}M_k$ prepared by coprecipitation of mixed solutions of the involved elements was examined. The catalyst was prepared as described below.

Approximately 0.0045 moles of copper nitrate, $Cu(NO_3)_2.3H_2O$, Johnson Matthey Company and 0.0255 moles of cerium nitrate, $Ce(NO_3)_3.6H_2O$ (99% purity), Aldrich, were dissolved in 200 ml deionized water. The solution was heated to 75° C. At this temperature, 23 ml of 2.0 M ammonium carbonate, $(NH_4)_2CO_3$, Fisher Scientific Company, was added dropwise during vigorous stirring. The resulting carbonate precipitate was filtrated and washed twice with hot water. The precipitate cake was dried at room temperature for 12 hours and then calcined at 600° C. for 3 hours. The calcined solid was then crushed and sieved, to particles of 35-100 mesh size, having a specific surface area of 30 m$^2$/g and packing density of 0.8 g/cc.

The activity of the $Cu_{0.15}Ce_{0.85}O_{1.85}$ composite catalyst was evaluated in a quartz tube reactor having a 0.6 cm I.D., as noted in EXAMPLE III. Approximately 150 mg of the above catalyst was loaded in the reactor. A gas stream, having a flowrate of 100 STP cc/min, containing 1% $SO_2$, 2% CO by volume and the balance He, was then introduced into the reactor. Over a temperature range of 430° C. to 600° C., 95% of inlet $SO_2$ was converted into elemental sulfur; COS and unreacted $SO_2$ comprised the balance of inlet $SO_2$ conversion products.

When 2% $H_2O$ was added into above-mentioned gas stream, 72% of inlet $SO_2$ was converted into elemental sulfur; $H_2S$ and unreacted $SO_2$, as well as trace amount of COS, comprised the balance of conversion products over the same temperature range.

X-ray powder diffraction analysis revealed the existence of only fluorite-type crystal phase in both a fresh and spent catalyst.

This example indicates that an active metal oxide composite catalyst formulation of the present invention, prepared by a coprecipitation method, is an active catalyst as better than 95% sulfur dioxide conversion, highly selective toward elemental sulfur, is realized. Furthermore, while the addition of water vapor to the feed gas stream promoted the production of $H_2S$, the catalyst was still active as a high conversion of sulfur dioxide was observed with high selectivity (72%) toward elemental sulfur.

EXAMPLE V

The activity and selectivity of sulfur dioxide over the catalyst prepared in EXAMPLE IV was evaluated utilizing reducing gases other than carbon monoxide.

Approximately 150 mg of the catalyst prepared in EXAMPLE IV was loaded in a quartz tube reactor having a 0.6 cm I.D., as noted in EXAMPLE III. A gas stream having a flowrate of of 100 STP cc/min, containing 1% $SO_2$ was then introduced into the reactor. When the reductant in, the feed gas was 2.6% $H_2$ by volume, the resulting product stream, at 600° C., contained 50.5% elemental sulfur and 49.5% $H_2S$. When the reductant was 1.8% by volume $H_2$, the resulting product stream, at the same temperature, contained 66% elemental sulfur, 13.4% $H_2S$, and 20.6% $SO_2$.

Similarly, 460 mg of the catalyst prepared as in EXAMPLE IV was tested in the quartz tube reactor of 0.6 cm I.D. A gas stream having a flowrate of 100 STP cc/min, containing 1% $SO_2$ was introduced into the reactor. When the reductant in the gas stream is 1% $CH_4$ by volume, the resulting product stream, at 800° C., contained 71.6% elemental sulfur, 25.0% $SO_2$, and 3.4% $H_2S$.

This example clearly illustrates that reductants other than CO may be used for $SO_2$ reduction over the composite catalyst formulations of the present invention.

EXAMPLE VI

The activity and selectivity of the reduction of sulfur dioxide by carbon monoxide in the presence of a metal oxide composite catalyst having the formula: $[(FO_2)_{1-n}(RO_{1.5})_n]_{1-k}M_k$ prepared by coprecipitation of solution mixtures of the involved elements was examined. A bulk catalyst was prepared by the process described in EXAMPLE IV.

Approximately 0.021 moles of praseodymium nitrate, $Pr(NO_3)_3.6H_2O$ (99.9% purity), 0.039 moles of cerium nitrate, $Ce(NO_3)_3.6H_2O$ (99% purity), Aldrich, and 0.0016 moles of copper nitrate $Cu(NO_3)_2.3H_2O$, Johnson Matthey, were dissolved in deionized water. The solution was at 75° C. to form a precipitate. The resulting precipitate was dried at room temperature, calcined at 600° C. for 3 hours, and crushed and sieved. The resulting $Cu_{0.026}Pr_{0.35}Ce_{0.65}O_{1.85}$ catalyst had a surface area of 11.4 m$^2$/g and a packing density of 1.33 g/cm$^3$.

Approximately 834 mg of the above catalyst was loaded into a quartz tube reactor having a 1.0 cm I.D. and pretreated for one hour in 10% CO/He at 300° C. A gas stream, having a flowrate of 200 STP cc/min, containing 1% $SO_2$, 2% CO by volume and the balance He, was then introduced into the reactor. Over a temperature range of 430° C. to 650° C., 95% of the inlet $SO_2$ was converted to elemental sulfur; COS and unreacted $SO_2$ comprised the balance of inlet $SO_2$ conversion products.

As indicated by the experimental results, various metal oxide composite formulations of the present invention are active catalysts. In the present example, better than 95% conversion, highly selective towards elemental sulfur, was observed.

EXAMPLE VII

The activity and selectivity of the reduction of sulfur dioxide by carbon monoxide in the presence of a composite catalyst having the formula: $[(FO_2)_{1-n}(RO_{1.5})_n]_{1-k}M_k$ prepared by coprecipitation of solution mixtures of the involved elements was examined. A bulk catalyst was prepared by the process described in EXAMPLE IV.

Approximately 0.015 moles of zirconyl chloride, $ZrOCl_2.8H_2O$, and 0.015 moles of copper nitrate, $Cu(NO_3)_2.3H_2O$, Johnson Matthey, were combined to form a precipitate which was dried, calcined, crushed and sieved, as noted in previous EXAMPLES. The resulting $Cu_{0.5}Zr_{0.5}O_{1.5}$ catalyst had a surface area of 58 m$^2$/g and a packing density of 4.9 g/cm$^3$.

Approximately 450 mg of the above catalyst was loaded in the reactor. A gas stream, having a flowrate of 100 STP cc/min, containing 1% $SO_2$, 2% CO by volume and the balance He, was then introduced into the reactor. Over a temperature range of 470° C. to 600° C., 95% of inlet $SO_2$ was converted into elemental sulfur; COS and unreacted $SO_2$ comprised the balance of inlet $SO_2$ conversion products.

When 2% $H_2O$ was added into the above gas stream, 70% of inlet $SO_2$ was converted into elemental sulfur; $H_2S$, unreacted $SO_2$, as well as a trace amount of COS, comprised the balance of inlet $SO_2$ conversion products over the same temperature range.

This example illustrates that various composite catalysts of the present invention are active in sulfur dioxide conversion (better than 95%) having high selectivity toward elemental sulfur. Furthermore, it was observed that the active catalyst formulations of the present invention are effective for both dry and wet gas conversions.

EXAMPLE VIII

The activity and selectivity of the reduction of sulfur dioxide by carbon monoxide in the presence of the composite catalyst having formula:

$[Ln_xZr_{1-x}O_{2-0.5x}]_{1-k}M_k$ prepared by coprecipitation of solution mixtures of the involved elements was examined. Two bulk catalysts were prepared by the process described in EXAMPLE IV.

The first catalyst was prepared as follows. Approximately 0.012 moles of zirconium dinitrate oxide, $ZrO(NO_3)_2 \cdot xH_2O$ (99.9% purity), and 0.012 moles of gadolinium nitrate, $Gd(NO_3)_3 \cdot xH_2O$ (99.9% purity), Johnson Matthey, were combined to form a precipitate which was dried, calcined at 700° C. for 4 hours, crushed, and sieved, as noted in previous EXAMPLES. The resulting $Gd_2Zr_2O_7$ catalyst had a surface of 37.5 $m^2/g$.

Approximately 150 mg of the above catalyst was loaded in the reactor. A gas stream, having a flow rate of 100 STP cc/min, containing 1% $SO_2$, 2% CO by volume and the balance He, was then introduced into the reactor. The reaction was started at 700° C. Over a temperature range of 470° C. to 700° C., 95% of the inlet $SO_2$ was converted into elemental sulfur; COS and unreacted $SO_2$ comprised the balance of inlet $SO_2$ conversion products.

When 2% $H_2O$ was added into above gas stream at 555° C., 67% of inlet $SO_2$ was converted into elemental sulfur; when 2% $H_2O$ was added into above stream at 510° C., no $SO_2$ conversion was observed.

The second catalyst was prepared as follows. Approximately 0.0102 moles of zirconium dinitrate oxide, $ZrO(NO_3)_2 \cdot xH_2O$, 0.0102 moles of gadolinium nitrate $Gd(NO_3)_3 \cdot xH_2O$, and 0.0009 moles of copper nitrate, $Cu(NO_3)_2 \cdot 3H_2O$, were combined to form a precipitate which was dried, calcined at 700° C. for 4 hours, crushed, and sieved, as noted in previous EXAMPLES. The resulting $Cu_{0.15}(Gd_2Zr_2)_{0.85}O_{6.1}$ catalyst had a surface area of 28.2 $m^2/g$.

Approximately 150 mg of the above catalyst was loaded in the reactor. A gas stream, having a flow rate of 100 STP cc/min, containing 1% $SO_2$, 2% CO by volume and the balance He, was then introduced into the reactor. The reaction was started at 510° C. Over a temperature range of 470° C. to 700° C., 95% of the inlet $SO_2$ was converted into elemental sulfur.

When 2% $H_2O$ was added into above gas stream, 67% of inlet $SO_2$ was converted into elemental sulfur over the temperature range from 500° C. to 650° C.

This example illustrates that the rare earth zirconates are active catalysts, and the activities can be greatly enhanced by incorporating transition metals into their formulations.

Although particular embodiments of the invention have been described in detail for purposes of illustration, various modifications may be made without departing from the spirit and scope of the invention. Accordingly, the invention is not to be limited except as by the appended claims.

What is claimed is:

1. A metal oxide composite catalyst formulation for the reduction of sulfur dioxide by a reducing gas to produce elemental sulfur, having an empirical formula selected from the group consisting of:

$$(FO_2)_{1-n}(RO)_n]_{1-k}M_k,$$

$$[(FO_2)_{1-n}(RO_{1.5})_n]_{1-k}M_k, \text{ and}$$

$$[Ln_xZr_{1-x}O_{2-0.5x}]_{1-k}M_k$$

wherein:
  $FO_2$ is a fluorite-type oxide,
  Ln is a rare earth element having an atomic number from 57 to 65, or a mixture thereof,
  RO is an alkaline earth oxide,
  $RO_{1.5}$ is a group IIIB oxide, rare earth oxide, or a mixture thereof,
  M is a transition metal, or a mixture thereof,
  n is a number having a value from 0.0 to about 0.35,
  k is a number having a value greater than 0.0 to about 0.5, and
  x is a number having a value from about 0.45 to about 0.55.

2. The catalyst of claim 1, wherein said fluorite-type oxide is selected from the group consisting of cerium oxide, thorium oxide, hafnium oxide, tantalum oxide, and zirconium oxide.

3. The catalyst of claim 1, wherein said alkaline earth oxide is magnesium oxide, selected from the group consisting of beryllium oxide, magnesium oxide, calcium oxide, strontium oxide, and barium oxide.

4. The catalyst of claim 1, wherein said transition metal is selected from the group consisting of manganese, iron, cobalt, nickel, copper, zinc, molybdenum, rhodium, palladium, silver, and platinum.

5. The catalyst of claim 1, wherein said group IIIB oxide, rare earth oxide, or mixture thereof is an oxide selected from the group consisting of scandium, yttrium, lanthanum, praseodymium, neodymium, samarium, europium, gadolinium, terbium, dysprosium, holmium, erbium, thulium, ytterbium, and lutetium.

6. The catalyst of claim 1, wherein said catalyst is unsupported and has a surface area of between about 1.0 $m^2/g$ and about 100.0 $m^2/g$.

7. The catalyst of claim 1, wherein said catalyst is supported and is between about 0.5 and about 50.0 percent, by weight, and has a surface area between about 20.0 $m^2/g$ and about 500.0 $m^2/g$.

8. The catalyst of claim 1, wherein said sulfur dioxide is present in a feed gas stream in a concentration between about 0.1 and about 10.0 percent, by volume.

9. The catalyst of claim 1, wherein said reducing gas is selected from the group consisting of carbon monoxide, hydrogen, natural gas, and mixtures thereof.

10. The catalyst of claim 1, wherein said reduction of sulfur dioxide by a reducing gas takes place at a temperature of between about 300° C. and about 800° C.

* * * * *